United States Patent [19]
Oda et al.

[11] Patent Number: 5,855,232
[45] Date of Patent: Jan. 5, 1999

[54] AUTOMATIC METERING/SUPPLYING APPARATUS FOR GRANULAR SUBSTANCES

[75] Inventors: Michiaki Oda; Shiniti Sugai; Chihiro Tashiro, all of Annaka, Japan

[73] Assignee: Shin-Etsu Handotai Co., Ltd., Tokyo, Japan

[21] Appl. No.: 804,120

[22] Filed: Feb. 20, 1997

[30] Foreign Application Priority Data

Feb. 27, 1996 [JP] Japan .................................. 8-065317

[51] Int. Cl.⁶ .............................. B65B 1/04; B65B 3/04
[52] U.S. Cl. .............................. 141/83; 141/364; 141/67
[58] Field of Search .............................. 141/83, 364, 284, 141/67, 363, 332, 365, 346; 222/460, 56, 185.1; 414/414, 422, 419, 420; 198/550.01, 550.2

[56] References Cited

U.S. PATENT DOCUMENTS

| | | | |
|---|---|---|---|
| 4,212,331 | 7/1980 | Benatar ...................................... | 141/67 |
| 5,156,194 | 10/1992 | Von Nehring et al. .................... | 141/83 |
| 5,259,425 | 11/1993 | Johnson et al. ............................ | 141/83 |
| 5,379,814 | 1/1995 | Posly ........................................ | 141/351 |
| 5,423,455 | 6/1995 | Ricciardi et al. .......................... | 141/83 |

FOREIGN PATENT DOCUMENTS

| | | |
|---|---|---|
| 63-135975 | 9/1988 | Japan . |
| 1-148780 | 6/1989 | Japan . |
| 2-92889 | 4/1990 | Japan . |
| 5-105575 | 4/1993 | Japan . |
| 8-143392 | 6/1996 | Japan . |

Primary Examiner—Steven O. Douglas
Attorney, Agent, or Firm—Oliff & Berridge, PLC

[57] ABSTRACT

An automatic metering/supplying apparatus is used for subdividing a granular silicon material. A cone member is placed on the upper opening portion of a drum, which contains the granular silicon material, so as to hold the drum. Subsequently, the drum is turned upside down by a rotary-type drum-inverting machine. Meanwhile, a quartz recharge tube into which the granular silicon material is to be discharged is placed on an electronic scale so as to measure the amount of the silicon material supplied to the quartz recharge tube. A valve control unit opens the valve to start the supply of the silicon material and closes the valve when the measured weight reaches a predetermined weight. Dust produced in the vicinity of the valve is sucked by a dust collection mechanism. The automatic metering/supplying apparatus can automate work for subdividing the granular silicon material contained in the drum. Further, collection of dust maintains the working environment clean.

9 Claims, 4 Drawing Sheets

AUTOMATIC METERING/SUPPLYING APPARATUS FOR GRANULAR SUBSTANCES

BACKGROUND OF THE INVENTION

1. Field of the Invention

The present invention relates to an automatic metering/supplying apparatus for granular substances, and more particularly to a technique that automates work for subdividing a granular silicon material used as a raw material in production of, for example, a single crystal of silicon, as well as to a technique for preventing generation of dust due to such work.

2. Description of the Related Art

Conventionally, when a single crystal of silicon is manufactured in accordance with, for example, the Czochralski method, a predetermined amount of a silicon material is first melted within a crucible disposed in a chamber, and a seed crystal is dipped into the melted silicon material. The seed crystal is then pulled upwardly so as to grow a single crystal.

In such a manufacturing process, it is necessary to prepare an initial material that is placed into the crucible at the beginning, as well as a replenishment material with which the crucible is replenished so as to compensate a decrease in the amount of the silicon material (hereinafter referred to as a "recharge material"). In order to facilitate the preparation of the initial material and the recharge material, a granular silicon material is subdivided into various amounts, and divided portions of the silicon material are packed into plastic bags, which are then sealed. During the subdividing work, a predetermined amount of a granular silicon material is scooped up, with a cup such as a polyethylene cup, from a drum that contains the granular silicon material, and is transported into a plastic bag. During such packing work, the weight of the granular silicon material in the plastic bag is measured so as to obtain a plurality of material packs that contain the granular silicon material in different amounts.

When the granular silicon material is used as a recharge material, a plastic bag holding a proper amount of granular silicon material is selected in accordance with the amount of the material to be recharged, and the granular silicon material is introduced into a replenishment tube (hereinafter referred to as a "quartz recharge tube") from the plastic bag, so that the crucible is replenished with the granular silicon material via the quartz recharge tube.

Conventionally, the work for subdividing the granular silicon material contained in the drum is manually performed by a worker. Therefore, the subdividing work is laborsome and has a problem that the accuracy of measurement varies according to differences among individuals. Moreover, there is a possibility that a foreign substance such as a heavy metal or a light element is mixed into the granular silicon material, resulting in contamination of the raw material. Also, since the granular silicon material contained in the drum cannot be directly introduced into the quartz recharge tube, the crucible, or the like, the efficiency decreases in particular when the silicon material is consumed in a large amount.

Moreover, dust produced during the handling of such a granular silicon material deteriorates the working environment.

Therefore, there has been demand for a measure that can automate the above-described subdividing work, that can prevent contamination of the raw material and eliminate variations in weight, and that can maintain high efficiency even when the raw material is consumed in a large amount.

There has also been a desire to maintain the working environment clean, by taking a measure against dust.

SUMMARY OF THE INVENTION

The present invention has been accomplished to solve the above-mentioned problems, and it is an object of the invention to provide an automatic metering/supplying apparatus for granular substances that supplies a predetermined weight of a granular silicon material into a predetermined reception container. The automatic metering/supplying apparatus comprises a valve that is attached to the exit portion of a supply opening of a drum and is opened and closed by valve control means, and weight measurement means for measuring the weight of a portion of the granular silicon material supplied to the reception container. The valve control means is designed such that upon reception of an input signal for opening the valve, it maintains the valve opened until the weight measured by the weight measurement means reaches a predetermined (preset) weight and closes the valve when the measured weight reaches the preset weight.

In the measuring/supplying apparatus, the valve attached to the exit portion of the supply opening of the drum is opened so as to start the supply of the granular silicon material from the drum, and is then closed to stop the supply. After being opened, the valve is maintained opened until the measured weight reaches the predetermined (preset) weight, and the valve is closed when the measured weight reaches the predetermined (preset) weight. Accordingly, a predetermined amount of the granular silicon material can always be supplied automatically.

Examples of the reception containers include a quartz recharge tube and a plastic bag. An example of the weight measurement means is an electronic scale, on which the reception containers can be placed. The weight of the granular silicon material is determined by subtracting the known weight of the reception container from the gross weight including the weight of the reception container.

An example of the valve control means includes a sequence control unit which opens the valve in response to a manual operation and then automatically closes the valve when the weight of the granular silicon material reaches the preset value.

In the automatic metering/supplying apparatus of the present invention, a valve is attached to the exit portion of the supply opening of the drum, and the valve is controlled based on the weight measured by the weight measurement means. Therefore, work for supplying the granular silicon material can be automated, resulting in savings of labor. In addition, the amount of the granular silicon material can be precisely set without variations in the case where the silicon material is used as an initial material, as well as in the case where the silicon material is used as a recharge material. The reduced variation in the supply amount improves crystal quality, and especially decreases variations in the concentration of interstitial oxygen. Moreover, there is no possibility that a foreign substance is mixed into the raw material to thereby cause contamination of the raw material.

Preferably, there is further provided posture changing means for changing the posture of the drum such that the granular silicon material can be discharged from the supply opening of the drum.

The above-described posture changing means is especially effective in the case where the supply opening is provided on the top portion of the drum. When the drum is tilted or is turned upside down so as to allow the granular silicon material to be discharged from the supply opening of the drum, further savings in labor can be realized.

Preferably, the weight of the granular silicon material supplied to the reception container can be freely set. Such setting can be manually performed through an input section of the valve control means, such as a touch panel.

In this case, the granular silicon material can be packed into various kinds of reception containers in different weights.

Preferably, the valve is controlled by the valve control means such that when the power supply is turned off, the valve is closed.

This prevents the granular silicon material in the drum from flowing out without limit, even when a power failure occurs while the raw material is being supplied.

Preferably, the final amount of the granular silicon material supplied to the reception container as measured by the weight measurement means is printed out by a printer.

When the amount of the granular silicon material supplied to the reception container reaches the preset weight, the supply of the silicon material is stopped. However, the final weight of the silicon material in the reception container may vary slightly. Therefore, the final weight of the silicon material supplied to the reception container is printed out and attached to, for example, a bag. This makes it possible to precisely check and manage the amount of the granular material remaining in the drum and the amount of the granular material taken out of the drum, thereby facilitating the handling of the granular silicon material.

Preferably, a dust collection mechanism is provided in the vicinity of the valve. This dust collection mechanism sucks dust produced in the vicinity of the valve while the granular silicon material is taken out of the drum.

Such a measure against dust maintains the working environment clean. This is preferable from the viewpoint of environmental hygiene.

DESCRIPTION OF THE PREFERRED EMBODIMENT

An embodiment of the present invention will now be described with reference to the drawings.

An automatic metering/supplying apparatus according to the present invention serves as an apparatus for automating work for subdividing a granular silicon material stored in a drum and used as a raw material in production of a single crystal of silicon in accordance with, for example, the Czochralski method. The apparatus is designed to make it possible to supply a predetermined amount of a granular silicon material to a plastic bag or a quartz recharge tube, as an initial material that is placed into the crucible at the beginning, or as a recharge material with which the crucible is recharged so as to compensate a decrease in the amount of the silicon material due to pulling of a single crystal.

Figure 1:
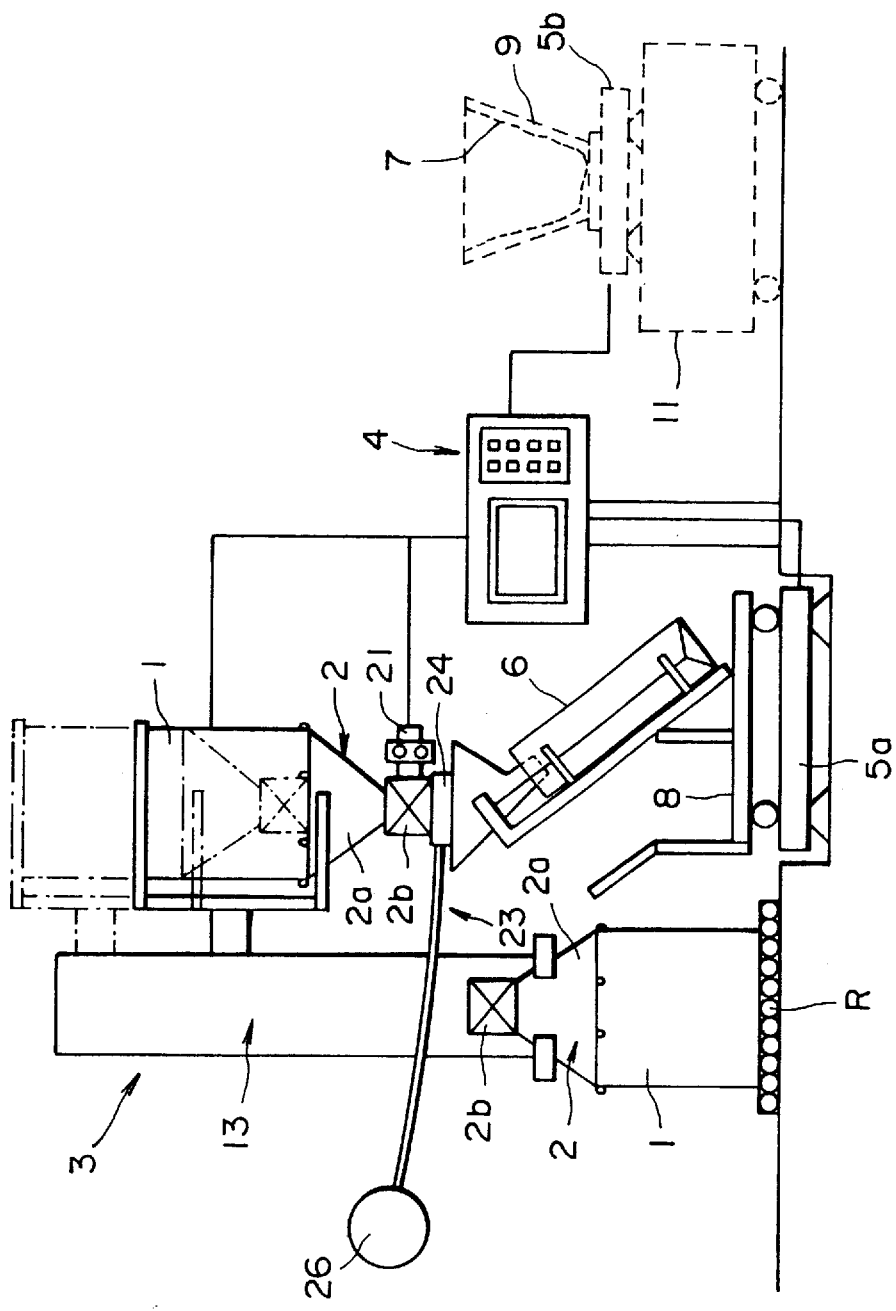
FIG. 1 is a view showing an example of the entire structure of an automatic metering/supplying apparatus according to the present invention.

That is, as shown in FIG. 1, the automatic metering/ supplying apparatus includes a rotary-type drum-inverting machine 3 serving as a posture changing means, a valve control unit 4, and first and second electronic scales 5a and 5b serving as a weight measurement means. The drum-inverting machine 3 places a cone member 2 on the upper opening portion of a drum 1 so as to chuck the drum 1 in the vertical direction, and turns the drum 1 upside down. The valve control unit 4 opens and closes a valve 2b disposed on the smaller-diameter side of a cone 2a of the cone member 2. The first and second electronic scales 5a and 5b send output signals to the valve control unit 4. The first electronic scale 5a serves to measure the weight of a portion of the granular silicon material supplied to a quartz recharge tube 6, while the second electronic scale 5b serves to measure the weight of a portion of the granular silicon material supplied to a plastic bag 7.

The quartz recharge tube 6 is placed on the first electronic scale 5a together with a support cart 8. The plastic bag 7 is placed on the second electronic scale 5b together with a bag-holding container 9. One of the quartz recharge tube 6 and the plastic bag 7 is selectively placed under the supply section of the automatic metering/supplying apparatus. Each of the electronic scales 5a and 5b operates to obtain the weight of the supplied portion of the silicon material based on the difference between the weight of the tube or bag before the granular silicon material is supplied and the gross weight after the granular silicon material is supplied thereto. The second electronic scale 5b is provided on, for example, on a transportation cart 11.

Figure 2:
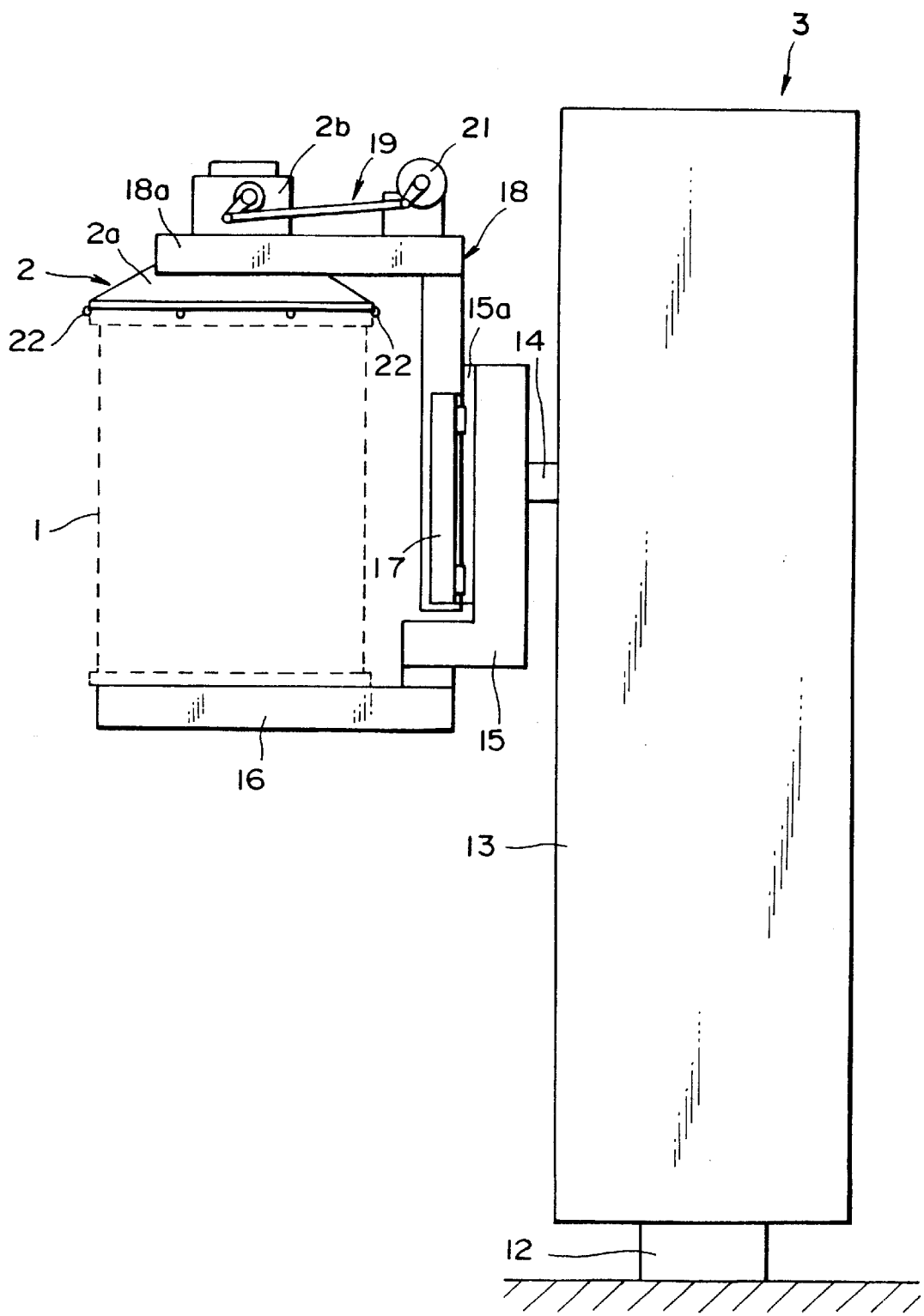
FIG. 2 is a side view showing an example of the structure of a posture changing mechanism.
Figure 3:
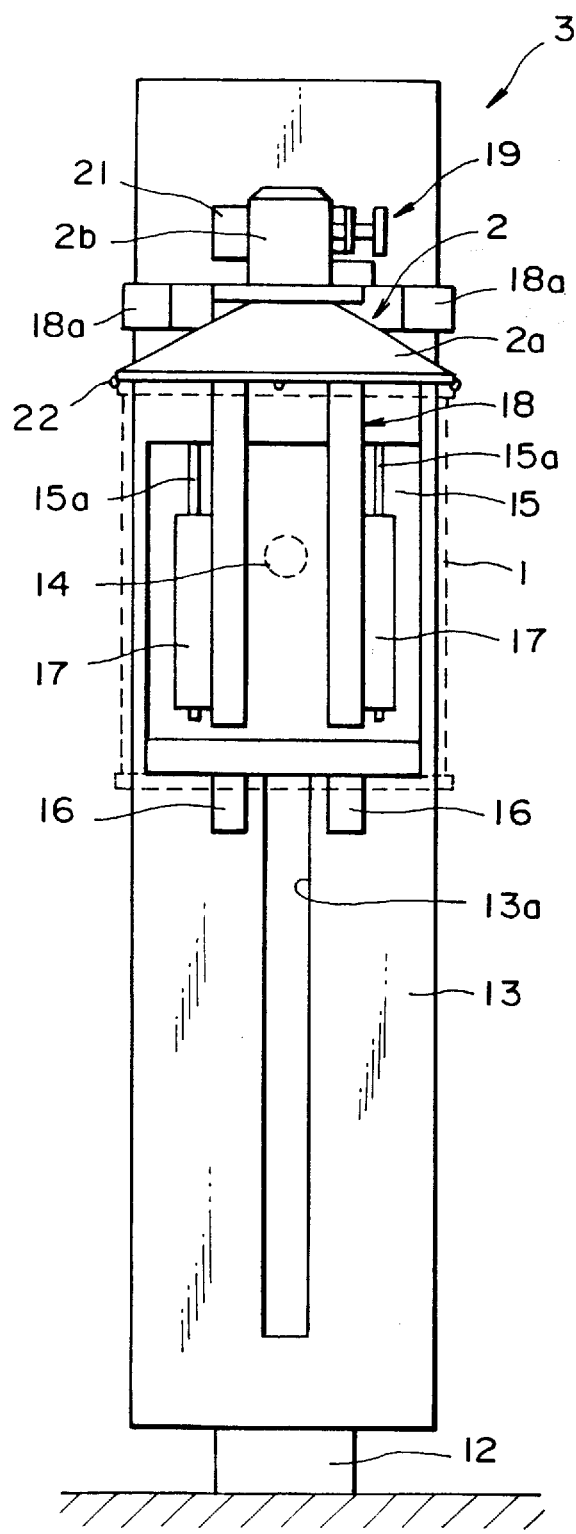
FIG. 3 is a front view of the posture changing mechanism of FIG. 2.
Figure 4:
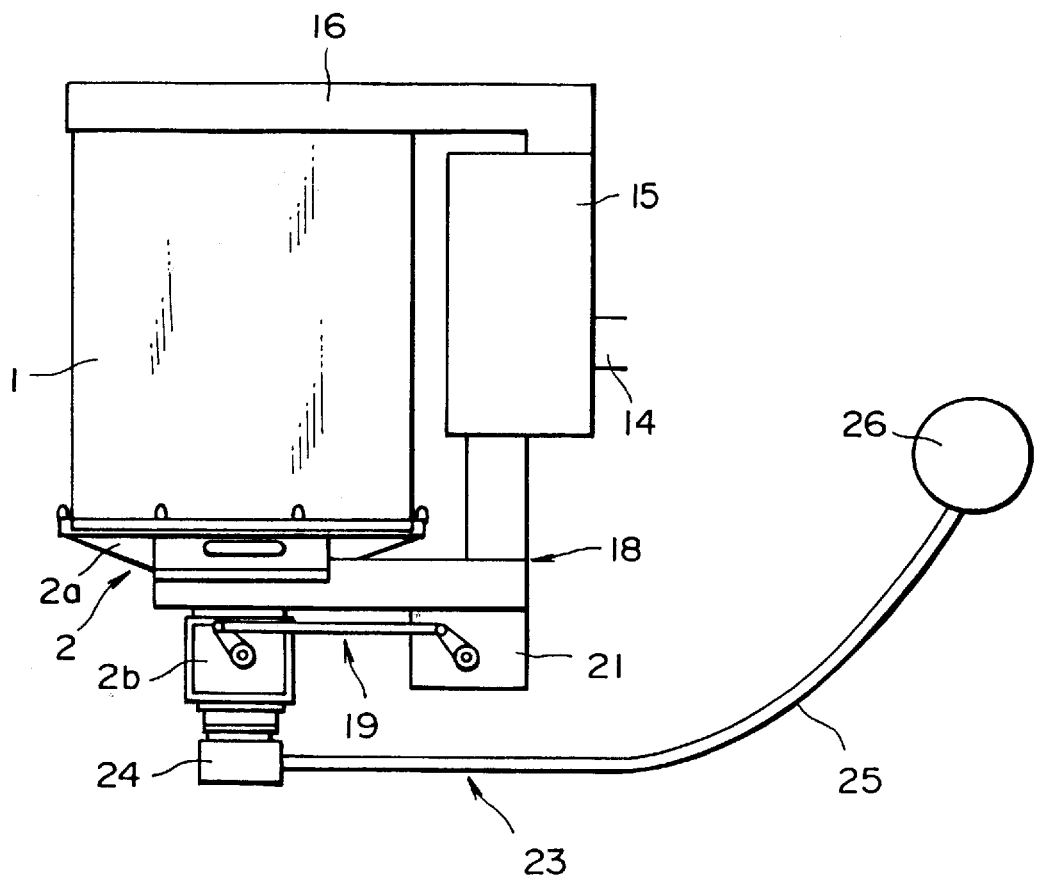
FIG. 4 is a view showing an example of the structure of a dust collection mechanism.

As shown in FIGS. 2 and 3, the rotary-type drum-inverting machine 3 includes a main body 13, a horizontal rotation shaft 14, an inverting plate 15, a pair of support arms 16, and a pair of guide rails 15a. The main body 13 is in a shape of a square pillar and is rotatably supported by a vertical rotation shaft 12 which extends upward from the floor. The horizontal rotation shaft 14 is vertically slidable along a guide groove 13a (see FIG. 3) formed on the front surface of the main body 13. The inverting plate 15 is attached to the front end of the horizontal rotation shaft 14. The pair of support arms 16 are fixed to the lower end of the inverting plate 15 and project forward. The pair of guide rails 15a are attached to the front face of the inverting plate 15. Slide guides 17 are engaged with the guide rails 15a such that the slide guides 17 are slidable in the vertical direction, and the slide guides 17 are connected to an elevation frame 18.

The above-described cone member 2 is attached to projection portions 18a which are projected forward from the upper end of the elevation frame 18. The cone member 2 is composed of the cone 2a and the valve 2b attached to the smaller-diameter side of the cone 2a such that the valve 2b communicates with the cone 2a. Connected to the valve 2b is one end of a link mechanism 19 which opens and closes the valve 2b. The other end of the link mechanism 19 is connected to a drive motor 21.

Along the circumferential edge portion of the opening of the cone 2a at its larger diameter side is disposed an unillustrated ring-shaped packing, and a plurality of guide rollers 22 are attached at a predetermined pitch. The ring-shaped packing is brought into close contact with the circumferential edge portion of the drum 1 so as to eliminate a space which would otherwise be produced between the circumferential edge portion of the cone 2a and the circumferential edge portion of the opening of the drum 1. The cone member 2 is attached to the opening of the drum 1 such that the guide rollers 22 surround the circumferential edge portion of the opening. That is, after the elevation frame 18 is raised, the drum 1 is placed on the support arms 16 such that the bottom surface of the drum 1 is supported by the support arms 16. Subsequently, the elevation frame 18 is lowered so that the cone 2a is placed on the top of the drum 1 so as to hold the drum 1 in the vertical direction. At this time, the clearance between the circumferential edge portion of the opening of the drum 1 and the circumferential edge portion of the opening of the cone 2a is sealed by the packing. Simultaneously, the guide rollers 22 engage and surround the outer surface of the circumferential edge portion of the opening of the drum 1 so as to prevent the drum 1 from slipping off while the posture of the drum 1 is changed.

In the above-described rotary-type drum-inverting machine 3, when the drum 1 is held in the vertical direction by the support arms 16 and the cone member 2, the drum 1 can be raised and lowered along the guide groove 13a of the main body 13. Also, the drum 1 can be inverted (i.e., rotated by 180 degrees in a vertical plane) by rotation of the inverting plate 15 about the horizontal rotation shaft 14. Moreover, when the main body 13 itself is rotated about the vertical rotation shaft 12, the position of the drum 1 can be changed.

Next, a description will be given of the abovementioned valve control unit 4.

The valve control unit 4 is formed by a sequence control circuit having a processing section, and an input/output section which includes, for example, control switches, a liquid crystal touch panel, and a printer. The valve control unit 4 receives input signals from the electric scales 5a and 5b, and sends control signals to the drive motor 21 of the valve 2b.

After the valve 2b is maintained opened, the valve control unit 4 closes the valve 2b via the drive motor 21 when the electric scale 5a or 5b detects that the measured weight has reached a predetermined (preset) weight.

The predetermined (preset) weight at which the valve 2b is closed can be freely set through use of a touch panel or the like. The printer prints out the final weight of the supplied silicon material after the supply is completed by closing the valve.

The valve used here is of a type that closes when the power supply is stopped.

Next, operation of the above-described automatic metering/supplying apparatus will be described.

First, the drum 1 containing a granular silicon material is placed on the free roller R, and the upper lid of the drum 1 is removed. Subsequently, when the rotary-type drum-inverting machine 3 is operated, the cone member 2 is automatically lowered so as to cover the upper opening portion of the drum 1, and the drum 1 is chucked by the support arms 16 and the cone member 2 and is lifted up.

When the drum 1 reaches a predetermined height, the drum 1 is rotated by 180 degrees around the horizontal rotation shaft 14, so that the drum 1 is brought into an inverted posture in which the granular silicon material within the drum 1 can be discharged through the valve 2b. However, the granular silicon material does not flow out, because the valve 2b is still closed.

At this time, one of the quartz recharge tube 6 and the plastic bag 7 is positioned on the electronic scale 5a or 5b at the supply section. In this state, the main body 13 is rotated about the vertical rotation shaft 12 by approximately 90 degrees. At this time, the drum 1 is positioned at one of two different heights (for example, the height indicated by the solid line and the height indicated by the broken line in FIG. 1) depending on whether the granular silicon material is supplied to the quartz recharge tube 6 or the plastic bag 7. This guarantees that the granular silicon material is supplied from an optimal height in either case.

When a start button is depressed after a weight of the granular silicon material to be supplied is set through use of the touch panel or the like, the valve 2b is opened to start automatic supply. When the weight of the supplied silicon material has reached the set weight, the valve 2b is closed so as to stop the supply. Subsequently, the final supply amount is printed out on, for example, a label. The label is attached to, for example, the plastic bag 7 in which the granular silicon material is stored in a sealed state.

During the above-described automatic supply, dust flies high from the clearance between the valve 2b and the quartz recharge tube 6 or the plastic bag 7, so that the working space is contaminated. This is not preferable from the viewpoint of environmental hygiene.

In the present invention, in order to solve the above-described drawback, a dust-collecting mechanism 23 is provided so as to collect dust that is produced in the area under the valve 2b and its vicinity. The dust-collecting mechanism 23 is composed of a ventilation hood 24 that surrounds the lower end portion of the valve 2b, a ventilation duct that communicates with the ventilation hood 24, and a sucking section 26.

In this case, dust generated during operation is collected, so that the environment in the room can be maintained clean. This is preferable from the viewpoint of environmental hygiene.

The present invention is not limited to the above-described embodiments. The above-described embodiments are mere examples, and other embodiments which have substantially the same structure as those defined in the appended claims and provide similar effects are included in the scope of the present invention.

The rotary-type drum-inverting machine 3 used in the above-described embodiment may have any structure. In addition, it is not necessary for the drum to be rotated by 180 degrees for inversion; it is sufficient for the drum 1 to be brought into a posture which allows the silicon material to be discharged.

The reception container is not limited to the quartz tube 6 and the plastic bag 7, and the granular silicon material may be supplied directly to the crucible.

What is claimed is:

1. An automatic metering/supplying apparatus for supplying a predetermined weight of a granular silicon material from a drum into a reception container, said automatic metering/supplying apparatus comprising:

a cone member capable of being placed on the opening of said drum in a sealed manner;

a valve attached to a tip end portion of said cone member;

weight measurement means for measuring the weight of a portion of the granular silicon material supplied to said reception container; and valve control means for opening said valve in response to an input signal and for closing said valve when the weight measured by said weight measurement means reaches a predetermined weight.

2. An automatic measuring/supplying apparatus according to claim 1, further comprising posture changing means for changing the posture of said drum such that the granular silicon material can be discharged from the supply opening of said drum.

3. An automatic measuring/supplying apparatus according to claim 1, wherein the weight of the granular silicon material supplied to said reception container can be set to an arbitrary value.

4. An automatic measuring/supplying apparatus according to claim 1, wherein said valve is controlled by said valve control means such that when power supply is turned off, said valve is closed.

5. An automatic measuring/supplying apparatus according to claim 1, wherein the final amount of the granular silicon material supplied to said reception container measured by said weight measurement means is printed out by a printer.

6. An automatic measuring/supplying apparatus according to claim 1, further comprising:

a dust collection mechanism disposed in the vicinity of said valve and adapted to suck dust produced in the vicinity of said valve while the granular silicon material is discharged from said drum.

7. An automatic metering/supplying apparatus for supplying a predetermined weight of a granular silicon material from a drum into a reception container, said automatic metering/supplying apparatus comprising:

a cone member capable of being placed on the opening of said drum in a sealed manner, a valve attached to a tip end portion of said cone member;

weight measurement means for measuring the weight of a portion of the granular silicon material supplied to said reception container;

valve control means for opening said valve in response to an input signal and for closing said valve when the weight measured by said weight measurement means reaches a predetermined weight;

posture changing means for changing the posture of said drum such that the granular silicon material can be discharged from the supply opening of said drum; and a dust collection mechanism disposed in the vicinity of said valve and adapted to suck dust produced in the vicinity of said valve while the granular silicon material is discharged from said drum, wherein the weight of the granular silicon material supplied to said reception container can be set to an arbitrary value.

8. An automatic measuring/supplying apparatus according to claim 7, wherein said valve is controlled by said valve control means such that when power supply is turned off, said valve is closed.

9. An automatic measuring/supplying apparatus according to claim 7, wherein the final amount of the granular silicon material supplied to said reception container measured by said weight measurement means is printed out by a printer.

* * * * *